United States Patent
Suzuki et al.

(10) Patent No.: US 9,838,546 B2
(45) Date of Patent: Dec. 5, 2017

(54) NOTIFICATION APPARATUS, NOTIFICATION SYSTEM, NOTIFICATION METHOD, AND PROGRAM

(71) Applicant: NTT DOCOMO, INC., Tokyo (JP)

(72) Inventors: Kazunari Suzuki, Tokyo (JP); Nobuhiro Sawai, Tokyo (JP); Teppei Azuma, Tokyo (JP); Koutarou Nagase, Tokyo (JP); Ryouhei Kurita, Tokyo (JP); Daisuke Satou, Tokyo (JP); Mei Hasegawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/907,991

(22) PCT Filed: Aug. 4, 2014

(86) PCT No.: PCT/JP2014/070452
§ 371 (c)(1),
(2) Date: Jan. 27, 2016

(87) PCT Pub. No.: WO2015/016374
PCT Pub. Date: Feb. 5, 2015

(65) Prior Publication Data
US 2016/0182737 A1  Jun. 23, 2016

(30) Foreign Application Priority Data
Aug. 2, 2013 (JP) ................... 2013-161657

(51) Int. Cl.
*H04M 11/00* (2006.01)
*H04M 15/00* (2006.01)
(Continued)

(52) U.S. Cl.
CPC ........ *H04M 15/852* (2013.01); *H04L 12/141* (2013.01); *H04M 15/49* (2013.01);
(Continued)

(58) Field of Classification Search
None
See application file for complete search history.

(56) References Cited

U.S. PATENT DOCUMENTS

| | | | | |
|---|---|---|---|---|
| 2007/0287413 | A1* | 12/2007 | Kleitsch | ......... H04L 12/14 455/405 |
| 2011/0270747 | A1* | 11/2011 | Xu | ......... G06Q 20/102 705/40 |
| 2014/0066005 | A1* | 3/2014 | Chang | ......... H04W 4/24 455/406 |

FOREIGN PATENT DOCUMENTS

| | | |
|---|---|---|
| EP | 2453632 A1 | 5/2012 |
| JP | 2002320050 A | 10/2002 |

(Continued)

OTHER PUBLICATIONS

PCT International Search Report issued in International Application No. PCT/JP2014/070452, dated Oct. 7, 2014, pp. 1-2.

(Continued)

*Primary Examiner* — Suhail Khan
(74) *Attorney, Agent, or Firm* — MKG, LLC

(57) ABSTRACT

A notification apparatus includes: an obtaining unit that obtains information on a use of a first mobile communication network when a mobile communication terminal configured to use selectively one of a first identifier and a second identifier which are assigned to the first mobile communication network and the second mobile communication network, respectively so as to perform a communication currently connects to the second mobile communication network using the second identifier; and a notifying unit that notifies the information obtained by the obtaining unit to the mobile communication terminal via the second mobile communication network.

8 Claims, 6 Drawing Sheets

(51) Int. Cl.
*H04W 4/24* (2009.01)
*H04L 12/14* (2006.01)

(52) U.S. Cl.
CPC ....... *H04M 15/8038* (2013.01); *H04M 15/83* (2013.01); *H04M 15/854* (2013.01); *H04W 4/24* (2013.01); *H04M 15/8044* (2013.01)

(56) References Cited

FOREIGN PATENT DOCUMENTS

| JP | 2012105075 A | 5/2012 |
| JP | 2012165154 A | 8/2012 |
| JP | 2013009298 A | 10/2013 |

OTHER PUBLICATIONS

Extended European Search Report issued in corresponding European Application No. 14832241.5 dated Mar. 27, 2017, pp. 1-12.
Notification of Reasons for Refusal issued in corresponding Japanese Application No. JP 2015-529640 dated Mar. 14, 2017, pp. 1-3.

* cited by examiner

|  | BALANCE |
|---|---|
| U1 | 4900 YEN |
| U2 | 200 YEN |
| U3 | 7 EUROS |

|  | REFERENCE |
|---|---|
| NETWORK 2a | 500 YEN |
| NETWORK 2b | 4 EUROS |

(b)

|  | REFERENCE FOR U1 | REFERENCE FOR U2 | REFERENCE FOR U3 |
|---|---|---|---|
| NETWORK 2a | 500 YEN | 510 YEN | 520 YEN |
| NETWORK 2b | 4 EUROS | 4 EUROS | 4.1 EUROS |

(c)

| NETWORK / REFERENCE | NETWORK 2a | NETWORK 2b |
|---|---|---|
| NETWORK 2a | 500 YEN | 550 YEN |
| NETWORK 2b | 4 EUROS | 3.5 EUROS |

FIG. 4

| USER ID |
|---|
| U1 |
| U2 |
| U3 |

| ITEMS | PROFILE A | PROFILE B |
|---|---|---|
| IMSI | IMSI-a | IMSI-b |
| TELEPHONE NUMBER | aaaa··· | bbbb··· |
| ⋮ | ⋮ | ⋮ |

FIG. 5

NOTIFICATION APPARATUS, NOTIFICATION SYSTEM, NOTIFICATION METHOD, AND PROGRAM

TECHNICAL FIELD

The present invention relates to a technology of sending a notification to a mobile communication terminal that is capable of using multiple mobile communication networks.

BACKGROUND ART

In some mobile communication terminals including a mobile phone, an attachable module referred to as a subscriber identity module or SIM is used to perform voice or data communication. An identification number referred to by an international mobile subscriber identity (IMSI) which is uniquely assigned to a user of a mobile communication terminal by a carrier providing a communication service is stored in a SIM. An IMSI includes: a mobile country code or MCC indicative of a country in which the user resides; a mobile network code or MNC indicative of a carrier to which the user subscribes; and a mobile station identification number or MSIN which is a code used for identifying the user. Since an IMSI indicates only a single useable country and information on a useable carrier, the IMSI is effective only for a single carrier and in single country. In some types of SIMs, a mobile international ISDN number or MSISDN, IC card ID or ICCID and other information can be stored in addition to the IMSI described above.

Recently, a standard of SIMs capable of rewriting IMSI, MSISDN, ICCID or other information via a mobile communication network has been proposed. Such a type of SIMs is referred to as an embedded subscriber identity module or eSIM. Rewriting of IMSI or other information stored in the eSIM allows a mobile communication terminal to use multiple carriers independently without need to use a roaming service.

For a mobile communication terminal capable of receiving communication services provided by different carriers, there may be a case in which a user must pay for each of the carriers or obtain information to connect with each network independently, which is inconvenient for the user. In this regard, a scheme of collectively performing a processing necessary to use multiple carriers has been proposed to omit a process performed when switching mobile communication networks provided by different carriers.

For example, JP2002-320050A discloses a system to pay collectively fees for services to carriers used by a user of a device capable of receiving multiple communication services provided by different carriers.

There may be case where it is necessary for a mobile communication terminal to obtain information about a carrier when receiving a communication service provided by the carrier at the mobile communication terminal. However, the system disclosed in JP2002-320050A does not include such a case.

SUMMARY

The object of the present invention is to send a notification containing information on usage of a mobile communication network to a mobile communication terminal configured to receive multiple mobile communication networks while using another mobile communication network.

In another aspect of the present invention, there is provided an apparatus including: an obtaining unit that obtains information on a use of a first mobile communication network when a mobile communication terminal is currently connected to a second mobile communication network using a second identifier, the mobile communication terminal configured to use selectively one of a first identifier and a second identifier which are assigned to the first mobile communication network and the second mobile communication network, respectively, so as to perform communication; and a notifying unit that notifies the information to the mobile communication terminal via the second mobile communication network.

Preferably, the apparatus further includes a memory that stores a credit balance available for a user of the mobile communication terminal, wherein the information includes a notice that the balance is less than an amount predetermined for the first mobile communication network.

Preferably, the apparatus further includes an inquiring unit that inquires about the balance available for the user of the mobile communication terminal at a management apparatus, wherein the information includes information indicative of whether the balance obtained by the management apparatus is less than the amount predetermined for the first mobile communication network Preferably, the apparatus further includes: a requesting unit that requests a payment apparatus to withdraw an amount of money greater than a difference between the predetermined amount and the balance from an account of the user of the mobile communication terminal when changing from the second mobile communication network to the first mobile communication network in a case where the balance is less than the predetermined amount.

Preferably, the notifying unit changes a format of the information in conformity with the second mobile communication network before being sent.

Preferably, the apparatus further includes a determination unit that determines whether the mobile communication terminal currently connected to the second mobile communication network a moves to an area in which the first mobile communication network can be used, wherein the notifying unit initiates the notification upon detection of the mobile communication terminal moving to the area Preferably, the apparatus further includes a receiving unit that receives an instruction of a user, which is input to the mobile communication terminal, wherein the notifying unit initiates the notification when the instruction indicates changing from the second mobile communication network to the first mobile communication network.

In another aspect of the present invention, there is provided a system including: a mobile communication terminal configured to use selectively one of identifiers each of which is assigned to respective one of communication networks, so as to perform communication; and a notification apparatus configured to notify the mobile communication terminal of information, the notification apparatus including: an obtaining unit that obtains information on a use of a first mobile communication network when the mobile communication terminal is currently connected to a second mobile communication network using a second identifier; and a notifying unit that notifies the information to the mobile communication terminal via the second mobile communication network, the mobile communication terminal including: a memory that stores a plurality of identifiers such that an identifier in use for performing communication is distinguishable from another identifier; and a prohibiting unit that prohibits a use of the other identifier.

In yet another aspect of the present invention, there is provided a method including: obtaining information on a use of a first mobile communication network when the mobile communication terminal is currently connected to a second mobile communication network using a second identifier, the mobile communication terminal configured to use selectively one of a first identifier and a second identifier which are assigned to the first mobile communication network and the second mobile communication network, respectively, so as to perform communication; and notifying information to the mobile communication terminal via the second mobile communication network.

In yet another aspect of the present invention, there is provided a program that causes a computer to execute: obtaining information on a use of a first mobile communication network when the mobile communication terminal is currently connected to a second mobile communication network using a second identifier, the mobile communication terminal configured to use selectively one of a first identifier and a second identifier which are assigned to the first mobile communication network and the second mobile communication network, respectively, so as to perform communication; and notifying information to the mobile communication terminal via the second mobile communication network.

According to the present invention, information on usage of a mobile communication network which is not currently used by a mobile communication terminal is notified to the mobile communication terminal while using another mobile communication network

BRIEF DESCRIPTION OF THE DRAWINGS

FIG. 3 shows an example of a balance table.

FIG. 4 shows an example of a reference table.

FIG. 5 shows an example of a profile database.

DETAILED DESCRIPTION

1. Exemplified Embodiment 1-1. Configuration of Notification System

Figure 1:
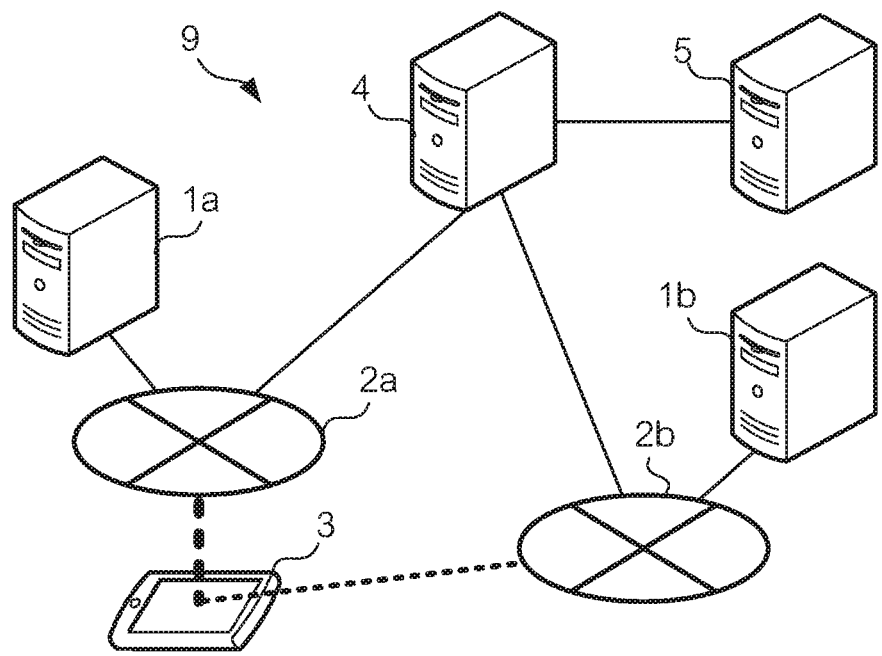
FIG. 1 shows an overall configuration of a notification system.

FIG. 1 shows an overall configuration of a notification system 9. Notification system 9 includes: management apparatuses 1a and 1b (hereinafter collectively referred to as "a management apparatus 1" when individual apparatuses are not necessarily to be identified); mobile communication networks 2a and 2b (hereinafter collectively referred to as "a mobile communication network 2"); a mobile communication terminal 3; a notification apparatus 4, and a payment system 5.

Mobile communication networks 2a and 2b are organized by different carriers. Each mobile communication network 2 provides a communication service to mobile communication terminal 3.

Mobile communication terminal 3 is a device that receives a wireless communication service using mobile communication network 2. For example, mobile communication terminal 3 is a mobile phone including a smart phone. Mobile communication terminal 3 includes a liquid crystal display or other types of displays to notify a user of information. Mobile communication terminal 3 performs a commutation using one of IDs each assigned to a respective one of mobile communication networks 2. Specifically, mobile communication terminal 3 includes an eSIM in which multiple IMSIs can be activated. An eSIM may be a module mechanically attachable to mobile communication terminal 3 or implemented as a built-in module. IMSIs may be changed in response to an input made by a user or an instruction received from a server via a mobile communication network 2 currently used by mobile communication terminal 3. An eSIM may select one of IMSIs stored in the eSIM or download an IMSI from the server when it is not stored in the eSIM. In this case, whether an IMSI is currently in use may be indicated by a flag assigned to the IMSI. In one embodiment, the eSIM included in mobile communication terminal 3 changes MSISDNs, ICCIDs, or other data items in addition to or alternatively to IMSIs. Although only one mobile communication terminal 3 is described in this example, notification system 9 may accommodate multiple communication terminals 3.

Each management apparatus 1 is a server that manages a user of mobile communication terminal 3 connected to a respective one of mobile communication networks 2 as a subscriber. For example, management apparatus 1 is a Home Location Register or HLR or Visitor Location Register or VLR that manages location information indicative of which base station covers an area where mobile communication terminal 3 is situated. Although two management apparatuses 1 and two mobile communication networks 2 are described in this example, three or more management apparatuses 1 and/or mobile communication networks 2 may be accommodated in notification system 9.

Notification apparatus 4 transmits a notification to mobile communication terminal 3 via either one of mobile communication networks 2. A balance of electronic money available for a user of mobile communication terminal 3 is stored in notification apparatus 4. Notification apparatus 4 is connected to payment system 5. Notification apparatus 4 calculates fees for a service which is provided by carriers of mobile communication networks 2 and received by mobile communication terminal 3 based on fee schedules provided by the carriers, and subtracts the calculated amount from the balance. When a balance of a user becomes less than a predetermined reference amount, notification apparatus 4 sends a notification to a mobile communication terminal 3 owned by the user. Next, notification apparatus 4 receives a response to the notification from the mobile communication terminal 3 and notifies an amount of money to be added to the balance managed by notification apparatus 4 and a bank account of the user to payment system 5, and requests payment system 5 to initiate a payment processing based on the notified information.

Payment system 5 includes financial institutions and a computer network organized by the Japanese Bankers Association or the CAFIS (Credit and Finance Information System) or the like. Payment system 5 performs a payment processing under an instruction made by notification apparatus 4. For example, the payment includes transferring an amount of money designated by notification apparatus 4 to a bank account designated by notification apparatus 4.

1-2. Configuration of Notification Apparatus

Figure 2:
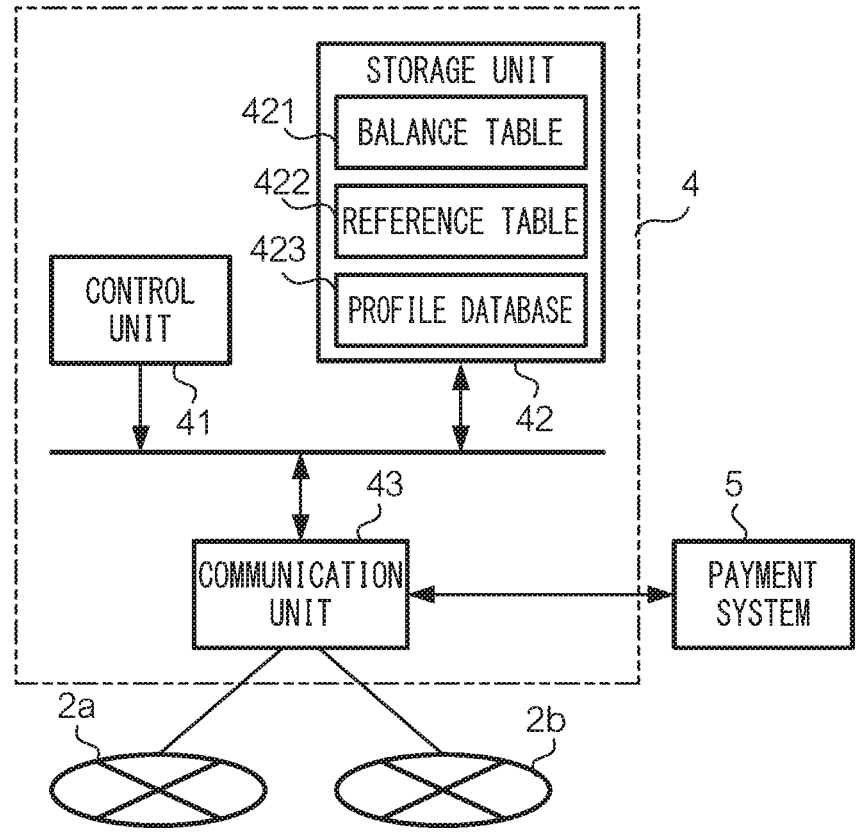
FIG. 2 shows an example of a configuration of a notification apparatus.

FIG. 2 shows an example of a configuration of notification apparatus 4. Notification apparatus 4 includes a control unit 41, storage unit 42, and communication unit 43.

Control unit 41 controls all the elements included in notification apparatus 4. Specifically, control unit 41 includes a CPU (Central Processing Unit) or other processors and a memory such as ROM (Read Only Memory), RAM (Random Access Memory), configured to execute a program(s) stored in the memory. Communication unit 43 is an interface configured to communicate with management apparatuses 1 and mobile communication terminal 3 via mobile communication networks 2. Communication unit 43 is also configured to communicate with payment system 5.

Storage unit 42 is a hard drive, flash memory or other large capacity storage that stores a program read by control unit 41. Storage unit 42 may include a removable disk or other detachable storage medium.

Also, storage unit 42 stores balance table 421, reference table 422, and profile database 423 (hereinafter, referred to as "a DB" in the figures). FIG. 3 shows an example of balance table 421. In balance table 421, user IDs of users of mobile communication terminals 3 are stored in association with credit balances (i.e., amounts of money remaining) of respective users of mobile communication terminals 3. For example, according to balance table 421 shown in FIG. 3, a balance of a user identified by user ID "U1" is 4900 yen.

FIG. 4 shows an example of reference table 422. In reference table 422 an amount of money as a reference for comparison with balances stored in balance table 421 is registered for each of mobile communication networks 2. A reference amount indicates an amount of money necessary to use a respective one of mobile communication networks 2. For example, according to reference table 422 shown in FIG. 4(a), 500 yen is necessary to use mobile communication network 2a and 4 euros for mobile communication network 2b.

Reference table 422 may be generated for each user ID. For example, storage unit 42 includes reference table 422 shown in FIG. 4(b), in which, a particular reference amount including RA1, RA2, and RA3) are defined for each user ID. In this case, an amount necessary to use a mobile communication network 2a for a user identified by a user ID "U3" is 520 yen, and 4 euros for the same user for mobile communication network 2b.

Reference table 422 may further store an amount of money necessary to change a profile of an eSIM. For example, storage unit 42 may include a reference table 422 shown in FIG. 4(c), in which a reference amount is defined as a combination of one of mobile communication networks 2 currently used and another one of mobile communication networks 2 to be used.

Specifically, in reference table 422 shown in FIG. 4 a reference amount is determined as 500 yen for connecting mobile communication network 2a. On the other hand, a reference amount of 550 yen, which is higher than 500 yen, is defined for changing from mobile communication network 2b to mobile communication network 2a. This is because an additional fee is incurred to download a new profile from a server when the profile is not stored in the eSIM, so as to change from mobile communication network 2b to mobile communication network 2a when the profile is expressed by IMSI, MSISDN, ICCID, telephone number, and the like, which corresponds to a carrier of mobile communication network 2a.

FIG. 5 shows an example of profile database 423. Profile database 423 stores profile tables for each user ID of a user of mobile communication terminal 3, each profile tables defining profiles assigned to a mobile communication network organized by a carrier which provides a service to the user. A profile of a carrier is comprised of an IMSI, MSISDN, ICCID, telephone number, or other information necessary to receive a service from the carrier. For example, as shown in FIG. 5, when a user subscribes to two carriers, two profiles are stored in the profile table, each of the profiles corresponding to a carrier organizing respective ones of mobile communication networks 2. For example, in profile database 423 shown in FIG. 5, a profile for a mobile communication terminal 3 owned by a user identified by user ID "U1" is "profile A" for mobile communication network 2a and "profile B" for mobile communication network 2b.

1-3. A Configuration of Mobile Communication Terminal

Figure 6:
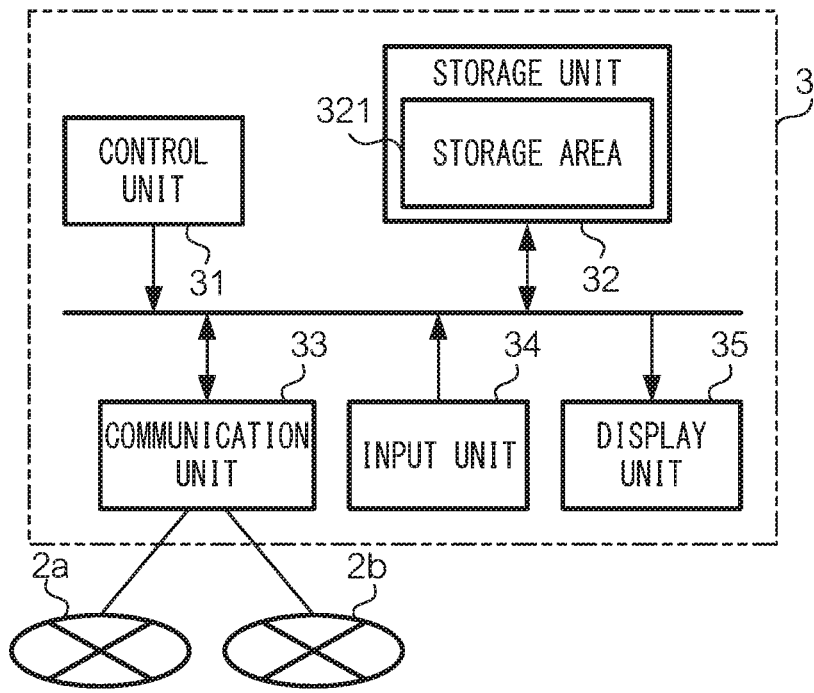
FIG. 6 shows a configuration of a mobile communication terminal.

FIG. 6 shows a configuration of mobile communication terminal 3. Mobile communication terminal 3 includes a control unit 31, storage unit 32, communication unit 33, input unit 34, and display unit 35.

Control unit 31 is configured to control all elements of mobile communication terminal 3. Control unit 31 includes a CPU or other processors and a memory including a ROM, RAM, to execute a program(s) stored in the memory. Communication unit 33 is configured to communicate with management apparatuses 1 and notification apparatus 4 via either one of mobile communication networks 2.

Input unit 34 includes a pointer, buttons, or other input devices to receive input of a user's instruction and to output a signal indicative of a received instruction to control unit 31. Display unit 35 is a display apparatus having a liquid crystal panel is employed, so as to display an image based on the instruction supplied by control unit 31.

Storage unit 32 is a hard drive, flash memory, or other large capacity storing means, that stores a program read by control unit 31. Storage unit 42 may include a removable disk or other detachable storage medium. Storage unit 32 includes the eSIM described above in which storage area 321 is provided.

Figure 7:
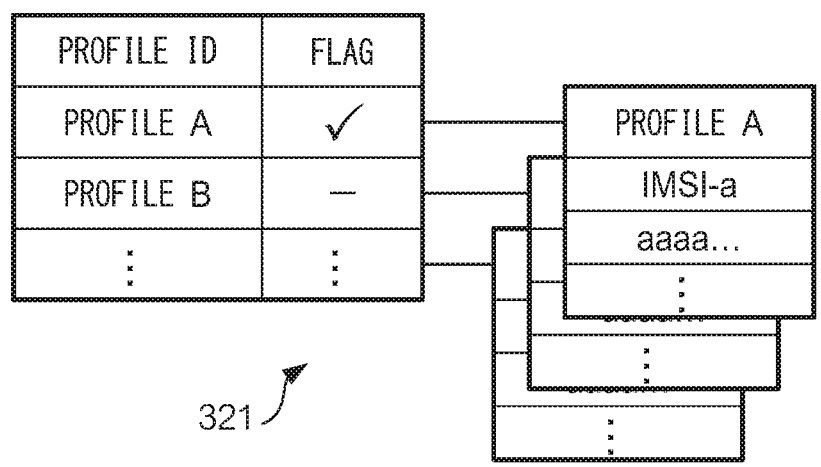
FIG. 7 shows an example of a storage area.

FIG. 7 shows an example of storage area 321. As shown in FIG. 7, in storage area 321, profile IDs each identifying a profile are associated with flags each indicative of availability of the profile. The flag provides information indicative of whether a profile identified by a profile ID can be used. A flag indicates only one profile selected from all the profiles stored in storage area 321. In the example shown in FIG. 7, a flag is described for a profile identified by "profile A," which means that profile A is currently available. A flag is not described in the profiles other than profile A, which means that it is prohibited to use profiles other than "profile A." Referring to the flag, a profile currently available for mobile communication terminal 3 to initiate a communication is distinguishable from other profiles. An IMSI included in a profile may be used as a profile ID of the profile. It is possible to prohibit control unit 31 from referring to a profile for which a flag is not described in addition to prohibiting use of the profile.

Storage unit 32 in which storage area 321 is provided, is an example of a storing means of the present invention that stores identification information sets such that a set of identification information currently used by a communication terminal to perform communication is distinguishable from other sets of identification information. Control unit 31 configured to prohibit use of a profile for which the flag is not described is an example of a restriction means of the present invention that prohibits use of profiles other than the profile stored in the storing means.

1-4. A Functional Configuration of a Notification Apparatus

Figure 8:
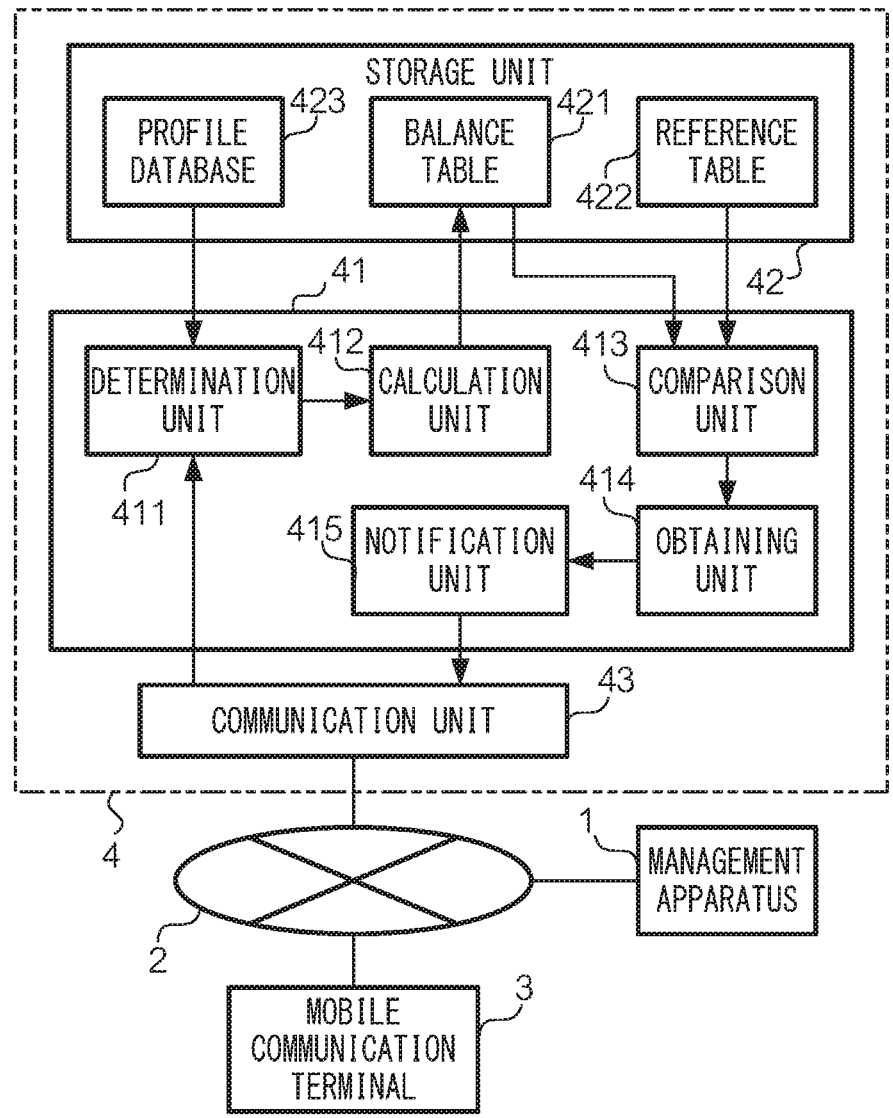
FIG. 8 shows a functional configuration of a notification apparatus.

FIG. 8 shows a functional configuration of notification apparatus 4. Functionalities of a determination unit 411, calculation unit 412, comparison unit 413, obtaining unit 414, and notification unit 415 are implemented by control unit 41 of notification apparatus 4.

Each mobile communication network 2 is configured to transmit a usage status with regard to the mobile communication network 2 to a mobile communication terminal 3 via a respective mobile communication network 2. Thus, a notification of a usage status with regard to one of mobile communication networks 2 is performed when the mobile communication terminal 3 uses one of mobile communication networks 2.

Mobile communication terminal 3 connects to one of mobile communication networks 2 using a profile stored in storage area 321 and assigned to one of mobile communication networks 2. Management apparatus 1 determines identification information of mobile communication terminal 3 based on the profile currently used by the mobile communication terminal 3.

After receiving a communication service using mobile communication network 2, mobile communication terminal 3 sends information on the received communication service including a total amount of exchanged data and passed time to management apparatus 1. Management apparatus 1 sends the information on the received service together with the identification information of mobile communication terminal 3.

Upon receipt of the information on the service and the identification information of mobile communication terminal 3 where the service is received from management apparatus 1, communication unit 43 of notification apparatus 4 supplies the information to control unit 41. Control unit 41 determines a user ID of a user of the mobile communication terminal 3 by interpreting information obtained by determination unit 411 referring to profile database 423. For example, in a case where management apparatus 1a notifies "IMSI-a" as identification information of mobile communication terminal 3, control unit 41 of notification apparatus 4 searches for "IMSI-a" in profile database 423 to determine a user ID of a user associated with a profile including "IMSI-a". In this case, "U1" is determined.

Calculation unit 412 calculates a fee for the communication service provided to mobile communication terminal 3 by applying a predetermined fee schedule to the information on the service notified by management apparatus 1. Next, calculation unit 412 reads a balance available for a user identified by the user ID determined by determination unit 411 from balance table 421, and subtracts the fee from the balance to update balance table 421.

When an amount of a balance stored in balance table 421 is changed upon receipt of a service by mobile communication terminal 3, comparison unit 413 compares the updated balance with reference amounts stored in reference table 422. For example, when mobile communication terminal 3 uses mobile communication network 2a using profile A, comparison unit 413 compares the updated balance with a reference amount (hereinafter, referred to as "the first reference amount") determined for the currently used mobile communication network 2a, and with reference amount (hereinafter referred to as "the second reference amount") determined for currently unused mobile communication network 2b. When there is a difference in the currency between the reference amount and the first/second reference amounts, comparison unit 413 may convert one of the reference amounts and the first/second reference amounts before making the comparison by referring to the latest exchange rate.

When the updated balance decreases below the first reference amount, obtaining unit 414 obtains a usage status indicative of the decrease. Similarly, when the updated balance decreases below the second reference amount, obtaining unit 414 obtains a usage status indicative of the decrease.

Notification unit 415 transmits the usage status obtained by obtaining unit 414 to mobile communication terminal 3 via mobile communication network 2 currently used by mobile communication terminal 3.

As described above, the first reference is determined for mobile communication network 2 currently used by mobile communication terminal 3. Thus, when the updated balance decreases below the first reference, obtaining unit 414 obtains a usage status indicative of the decrease as a usage status on one of mobile communication networks 2 currently used by mobile communication terminal 3. Next, notification unit 415 notifies the usage status to mobile communication terminal 3 via one of the mobile communication networks 2. As a result, the notification is performed in conformity with a setting inherently determined by one of mobile communication networks 2 via the one of the mobile communication networks 2.

On the other hand, the second reference amount is determined for one of mobile communication networks 2 currently unused by communication terminal 3, as described above. Thus, when the updated balance decreases below the second reference amount, obtaining unit 414 obtains information indicative of the decrease as a usage status of the one of mobile communication networks 2 currently unused by mobile communication terminal 3. Notification unit 415 notifies the usage status to mobile communication terminal 3 via another one of mobile communication networks 2 currently used by mobile communication terminal 3. As a result, an additional notification is made which is not inherently predetermined by a mobile communication network 2. Stated otherwise, obtaining unit 414 is configured to obtain a usage status generated when: a mobile communication terminal currently using the second mobile communication network; and the first mobile communication network is subject to a policy of notifying a usage status of the first mobile communication network to the mobile communication terminal via the first mobile communication network.

1-5. An Operation of Notification System

Figure 9:
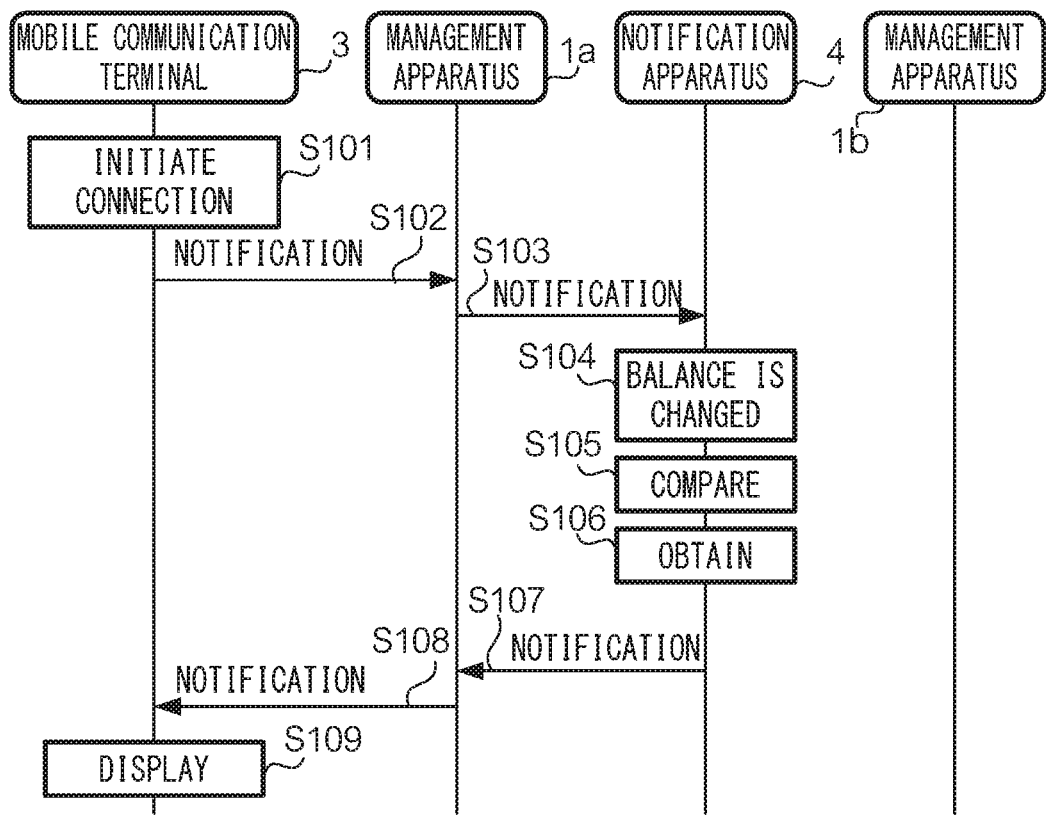
FIG. 9 is a sequence chart explaining an operation of a notification system.

FIG. 9 is a sequence chart explaining an operation of notification system 9. When mobile communication terminal 3 receives a communication service in step S101 using mobile communication network 2a, mobile communication terminal 3 sends information on the received service including an amount of exchanged data and a time of use for management apparatus 1a, via mobile communication network 2a in step S102. Management apparatus 1a notifies the information received by mobile communication terminal 3, and the identification information of mobile communication terminal 3 to notification apparatus 4 in step S103.

Control unit 41 of notification apparatus 4 calculates a fee based on the amount of data and the time of use as received by management apparatus 1a and reduces the balance associated with the user ID of the user of mobile communication terminal 3 in balance table 421 by the amount of the calculated fee. As a result, the balance stored in balance table 421 is updated in step S104. Control unit 41 of notification apparatus 4 compares the updated balance with reference amounts stored in reference table 422 in step S105 to check whether the updated balance is less than the reference amount. When the updated balance is less than any one of the reference amounts stored in reference table 422, control unit 41 of notification apparatus 4 obtains information indicative of the shortage in step S106. Next, control unit 41 notifies the obtained information to management apparatus 1a via communication unit 43 in step S107. Management apparatus 1a notifies the information notified by notification apparatus 4 to mobile communication terminal 3 in step S108. Upon receipt of the notification from management apparatus 1a, mobile communication terminal 3 displays a message that the balance of electronic money available for the user of the mobile communication terminal 3 is less than any one of the reference amounts stored in reference table 422 in step S109.

In the configuration described above, it is possible to notify information on a usage of one of mobile communication networks 2 currently unused by mobile communication terminal 3 to mobile communication terminal 3 by notification apparatus 4 of notification system 9, in addition to information on a usage of another one of mobile communication networks 2 which is currently used.

2. Modifications

The above exemplified embodiment can be modified as described below. The modifications described below can be combined with each other.

2-1. Modification 1

In the exemplified embodiment, when the updated balance is less than the second reference amount information obtaining unit 414 of notification apparatus 4 obtains information indicative of a shortage of a balance with regard to the second reference amount as a usage status of one of mobile communication networks 2, which is currently unused by mobile communication terminals 3, and notification unit 415 of notification apparatus 4 notifies the usage status to mobile communication terminal 3 via another one of mobile communication networks 2 which is currently used by communication terminal 3. Notification to mobile communication terminal 3 by notification apparatus 4 may contain content other than a balance of electronic money available for a user. For example, the notification contains information on a period of time during which a mobile communication network 2 cannot be used due to maintenance. Alternatively, the notification includes a time of campaign in which a particular service is discounted. Simply stated, content of the notification can include any content as long as such content relates to a usage of any one of mobile communication networks 2.

Figure 10:
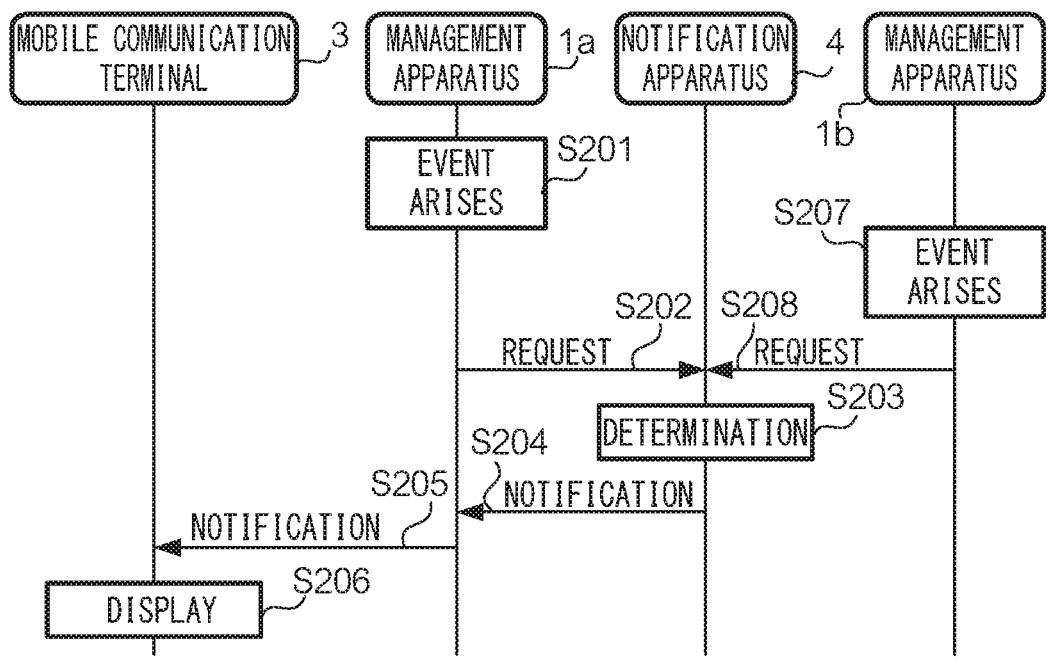
FIG. 10 is a sequence chart explaining an operation of a notification system according to a modification.

FIG. 10 is a sequence chart explaining an operation of notification system 9 according to the present modification. In a case where an event arises in management apparatus 1a managing mobile communication network 2a when mobile communication terminals 3 is using mobile communication network 2a in step S201, management apparatus 1a requests notification apparatus 4 to notify the event to mobile communication terminals 3 which can use mobile communication network 2a via mobile communication network 2a in step S202. Upon receipt of the request, notification apparatus 4 extracts a profile(s) which includes the IMSI assigned to mobile communication network 2a by referring to profile database 423 stored in storage unit 42 and determines a user ID(s) of the extracted profile(s) in step S203. Next, notification apparatus 4 sends a notification requested by management apparatus 1a using the profile associated with the determined user ID(s) to a mobile communication terminal(s) 3 of a user(s) identified by the user ID(s).

For example, in a case where the event is notified to mobile communication terminal 3 used by a user of user ID "U1" via mobile communication network 2a, notification apparatus 4 reads profile A from profile database 423 shown in FIG. 5 and notifies the event using IMSI-a to management apparatus 1a in step S204. Management apparatus 1a sends the notification of the event to mobile communication terminal 3 in step S205. Upon receipt of the notification from management apparatus 1a, mobile communication terminal 3 displays a message representative of the event in step S206.

In a case where an event occurs in management apparatus 1b managing communication network 2b which is not currently used by a mobile communication terminal 3 in step S207 when the mobile communication terminal 3 is using mobile communication network 2a, management apparatus 1b requests notification apparatus 4 to send a notification of the event to mobile communication terminals 3 that can use mobile communication network 2b in step S208. Upon receipt of the request, notification apparatus 4 extracts a profile(s) including the IMSI assigned to mobile communication network 2b by referring to profile database 423 stored in storage unit 42, and determines a user ID(s) of the extracted profile(s). Next, notification apparatus 4 sends the notification requested by management apparatus 1b using the profile associated with the determined user ID(s) to a mobile communication terminal(s) 3 owned by a user(s) identified by the user ID(s).

As a result, notification apparatus 4 determines a user ID(s) of a user(s) of a mobile communication terminal(s) 3 that can use mobile communication network 2b and currently uses mobile communication network 2a. Notification apparatus 4 searches for the IMSI used by the mobile communication terminal(s) 3 in profile database 423 and connects to mobile communication network 2a so as to notify the mobile communication terminal 3(s) of the event using the IMSI.

According to the present modification, it is possible to send a notification by notification apparatus 4 of notification system 9, upon receipt of a request for a push notification from a management apparatus 1 which manages a corresponding one of mobile communication networks 2 which can be used by a mobile communication terminal 3, regardless of whether the mobile communication terminal 3 currently uses the corresponding one of mobile communication networks 2.

2-2. Modification 2

Although in the exemplified embodiment described above notification apparatus 4 compares the balance available for a user of mobile communication terminal 3 with reference amounts determined for mobile communication networks 2, the comparison may be performed by management apparatus 1.

Figure 11:
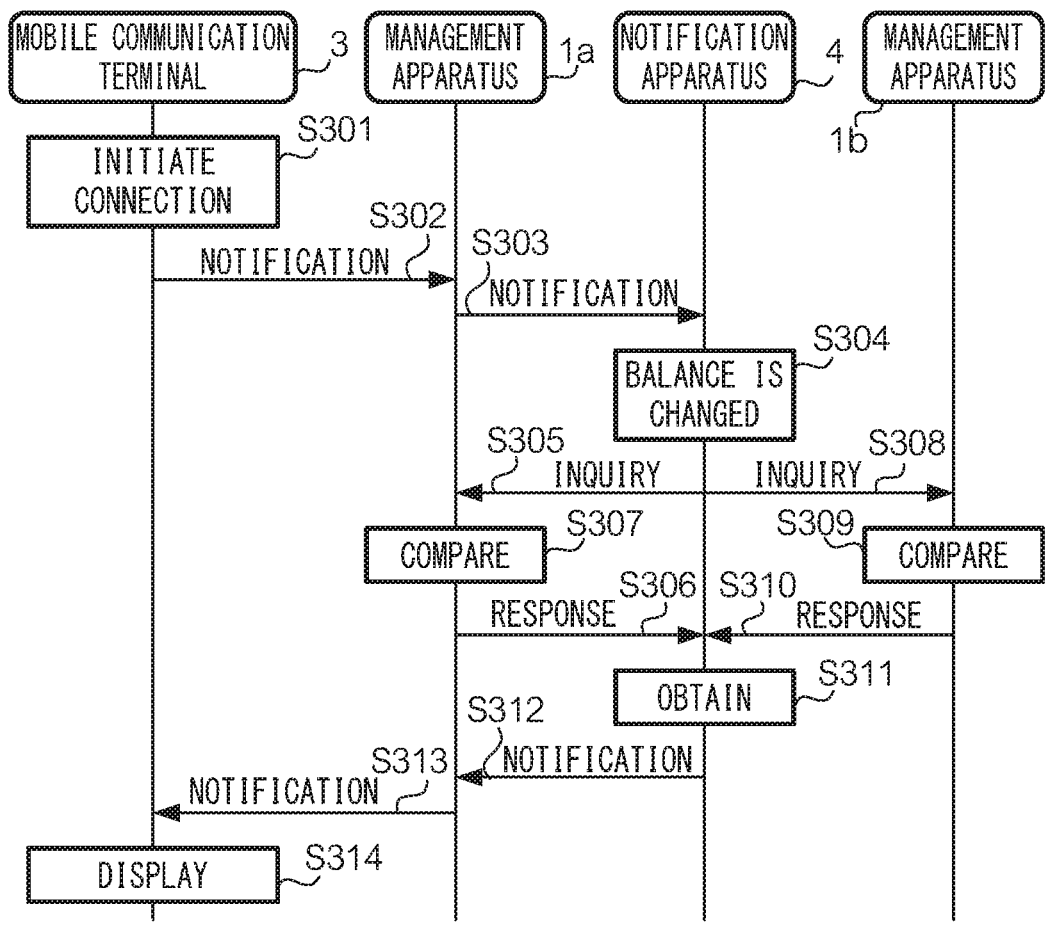
FIG. 11 is a sequence chart explaining an operation of a notification system according to another modification.

FIG. 11 is a sequence chart explaining an operation of notification system according to the present modification. Steps S301 to S304 shown in FIG. 11 correspond to steps S101 to S104 shown in FIG. 9, respectively. Similarly, steps S308 to S311 shown in FIG. 11 correspond to steps S106 to S109 shown in FIG. 9, respectively. Therefore, explanation of these steps is omitted.

When a balance stored in balance table 421 is updated, control unit 41 of notification apparatus 4 inquires at each management apparatus 1 whether the updated balance is less than a reference amount determined for each mobile communication network 2 in step S305. Each management apparatus 1 compares the updated balance with a reference amount determined for a respective one of mobile communication networks 2 which is managed by the management apparatus 1 in step S306 and responds with a result of the comparison to notification apparatus 4 in step S307. When it is determined that the updated balance is less than any one of the reference amounts according to the responses from management apparatuses 1, notification apparatus 4 is informed in step S308.

According to the present modification, the comparisons between a balance available for a user of mobile communication terminal 3 and a reference amount determined for each of mobile communication networks 2 are performed by a respective one of management apparatuses 1 that manages a respective one of mobile communication networks 2. In this case, the reference amounts may not necessarily be stored in notification apparatus 4.

2-3. Modification 3

When the mobile communication terminal 3 changes a network to the one of mobile communication networks 2 and a balance available for a user of a mobile communication terminal 3 is less than a reference amount determined for one of mobile communication networks 2 and, notification apparatus 4 may request payment system 5 to initiate a payment processing of withdrawing an amount of money greater than an amount of a difference between the balance and the reference amount from a back account of the user of the mobile communication terminal 3. In this case, storage unit 42 of notification apparatus 4 may update balance table 421 by rewriting the balance by adding the amount of money withdrawn from the back amount of the user in response to the request of the payment processing. According to this configuration, a payment processing automatically starts when a balance available for a user is less than a reference amount determined for a mobile communication network 2 to which a mobile communication terminal 3 switches. In this way, a possibility of imposing a restriction on a use by a carrier of a mobile communication network 2 to the mobile communication terminal 3 is reduced.

2-4. Modification 4

Notification apparatus 4 may include a determination unit that determines whether a mobile communication terminal 3 enters an area where one of mobile communication networks 2 can be used when the mobile communication terminal 3 currently uses another one of communication networks 2. For example, when it is determined that a mobile communication terminal 3 moves into an area where mobile communication network 2b can be used when mobile communication network 2a is used, notification apparatus 4 may notify a usage status of mobile communication network 2b which is not yet used to mobile communication terminal 3 via mobile communication network 2a which is currently used.

There may be a case where a user forgets information about a carrier operating in a country B to which the user is not planning to switch in the near future if the user is notified during a stay in a country A. According to the present modification, when a mobile communication terminal 3 moves into an area where one of mobile communication networks 2 is provided in country B, a user is notified of a usage status of the mobile communication networks. Thus, the user is informed of a usage status before initiating a change of networks.

2-5. Modification 5

Notification apparatus 4 may include a receiving unit that receives a signal indicative of an instruction input to mobile communication terminal 3 by a user, so as to notify a usage status of a mobile communication network 2 which will be selected to the mobile communication terminal 3 via a currently used mobile communication network 2 currently used upon receipt by the receiving unit of an instruction for changing networks.

According to the present modification, usage status, which may include a notification that newly selected mobile communication network 2 is undergoing maintenance and a notification that a balance is less than a reference amount determined for the newly selected mobile communication 2, can be sent to a user of a mobile communication terminal 3 before changing networks. This allows the user to consider charging electronic money while continuing with a connection to the currently used mobile communication network 2, consider selecting another useable mobile communication network 2, or take other actions. As a result, a problem where the user is in deadlock because the user cannot use the newly selected mobile communication network 2 is prevented.

2-6. Modification 6

The present invention also includes a method of controlling notification apparatus 4 in addition to notification apparatus 4.

2-7. Modification 7

A program executable by control unit 41 of notification apparatus 4 may be provided by means of a magnetic tape, magnetic disk, or other magnetically recording medium, optical disk or other optical recording medium, opto-magnetic recording medium, semiconductor memory or other storing medium readable by a computer. The program may be downloaded via the Internet or other computer networks. Control unit 41 may be implemented by a processor other than a CPU which is exemplified above such as a designated processor, for example.

2-8. Modification 8

Although mobile communication terminal 3 is described as a mobile phone such a smart phone in the exemplified embodiment, mobile communication terminal 3 may be another device. For example, mobile communication terminal 3 is a tablet device, slate PC (Personal Computer), PDA (Personal Digital Assistant), portable music/video player, portable game console, electronic book reader, and a navigation device.

2-9. Modification 9

Although notification apparatus 4 notification system 9 notifies information on a mobile communication network 2 which is not currently used by a mobile communication terminal 3 to the mobile communication terminal 3 in the exemplified embodiments, it is possible to edit the information based on a mobile communication network 2 currently used by the mobile communication terminal 3. In this case, storage unit 42 of notification apparatus 4 may store information based on which the edit is performed for each of mobile communication networks 2 that the mobile communication terminal 3 can use, so as to allow control unit 41 of notification apparatus 4 to edit the information referring to storage unit 42.

Notification apparatus 4 may convert a currency of a balance available for a mobile communication network 2 which is not currently used by a mobile communication terminal 3 into a currency of a balance determined for a currently used mobile communication network 2.

Notification apparatus 4 may translate a usage status of a mobile communication network 2 currently unused by a mobile communication terminal 3 into a language used in a mobile communication network 2 currently used by a mobile communication terminal 3 before being sent.

Notification apparatus 4 may calculate a tax levied for a service which is provided by a carrier that manages a mobile communication network 2, received by mobile communication terminal 3, and determined based on the law applied to the service using the mobile communication network 2, so as to incorporate the tax in a fee for the service determined in accordance with a fee schedule provided by the carrier.

2-10. Modification 10

Notification sent by notification apparatus 4 of notification system 9 may include various items of information with regard to a use of the mobile communication network 2 other than a notice that the latest balance is less than a reference amount, a notice of a time in which a service by means of a mobile communication network 2 will be temporarily stopped due to maintenance, a notice of a special offer of discount a fee for a particular service for a limited time period, which are described in the exemplified embodiment. For example, the usage status sent by notification apparatus 4 may include an address of a service center of a mobile communication network 2.

Notification apparatus 4 may detect that a mobile communication terminal 3 currently using mobile communication network 2a has moved into an area of mobile communication network 2b, determine a location of the mobile communication terminal 3, compare services provided by communication networks 2a and 2b in terms of a fee and/or performance, and notify a usage status including a result of the comparison.

Notification apparatus 4 may notify a usage status including credit information on user of mobile communication terminal 3, which may indicate a record of a default or delay of payment.

2-11. Modification 11

In the exemplary embodiment, notification apparatus 4 of notification system 9 switches IMSIs in response to an instruction of a user or a request from a server to change mobile communication networks 2. It is possible to automatically switch mobile communication networks 2 within a country in which a restriction is imposed on mobile communication networks 2, to accord with the restriction. In this case, upon detection that a mobile communication terminal 3 has moved to an area of a mobile communication network 2 in a country having a policy that terminals must be connected to the mobile communication network 2, the mobile communication terminal 3 may be caused to connect to the mobile communication network 2.

2-12. Modification 12

Although mobile communication networks 2a and 2b are organized by different carriers in the embodiment described above, they may be organized by the same carrier. Stated otherwise, mobile communication terminal 3 may select one of platforms provided by a single carrier as a mobile communication network 2. Mobile communication networks 2 can be considered as networks provided by a single carrier for which different fee schedules are applied. In this case, although each of mobile communication networks 2 are physically configured using a shared infrastructure, if they can be logically distinguishable in terms of fee schedule, terms of conditions and/or contrasts of a service or the like, they can be different networks.

2-13. Modification 13

Although mobile communication terminal 3 in notification system 9 includes a display unit 35 to display messages indicative of a usage status of a currently used mobile communication network 2 or currently unused mobile communication network 2 in the embodiment described above, a usage status may not be displayed in display unit 35. For example, usage status is notified to a user by means of an external device connected to a mobile communication terminal 3 by short range wireless communication. In this case, mobile communication terminal 3 may not include a display unit.

The external device may be a watch-type device, pulsimeter, or wearable device including a pedometer. The notification may be performed by way of sound, vibration, a combination thereof or other non-visual communication. Visual notification and non-visual communication can be combined.

DESCRIPTION OF REFERENCE NUMERALS

1(1a, 1b) . . . management apparatus, 2 (2a, 2b) . . . mobile communication network, 3 . . . mobile communication terminal, 31 . . . control unit, 32 . . . storage unit, 321 . . . storage area, 33 . . . communication unit, 34 . . . input unit, 35 . . . display unit, 4 . . . notification apparatus, 41 . . . control unit, 411 . . . determination unit, 412 . . . calculation unit, 413 . . . comparison unit, 414 . . . obtaining unit, 415 . . . notification unit, 42 . . . storage unit, 421 . . . balance table, 422 . . . reference table, 423 . . . profile database, 43 . . . communication unit, 5 . . . payment system, 9 . . . notification system.

What is claimed is:

1. An apparatus comprising:

a memory that stores a credit balance available for a user of a mobile communication terminal;

an obtaining unit that obtains usage status information on a use of a first of a plurality of mobile communication networks, which is generated based on the credit balance when the mobile communication terminal is currently connected to a second of the plurality of mobile communication networks using a second of a plurality of identifiers, the usage status information including a predetermined amount for the use of the first mobile communication network and a notice if the credit balance is less than the predetermined amount for the use of the first mobile communication network, the mobile communication terminal configured to use selectively one of a first of the plurality of identifiers and the second identifier which are assigned to the first mobile communication network and the second mobile communication network, respectively, so as to selectively perform communication; and a notifying unit that notifies the usage status information to the mobile communication terminal via the second mobile communication network;

wherein:

the usage status information includes first usage status information indicative of whether the balance is less than a first predetermined amount for the use of the second mobile communication network that is currently used by the mobile communication terminal, and second usage status information indicative of whether the balance is less than a second predetermined amount for the use of the first mobile communication network that is currently unused by the mobile communication terminal; and the first predetermined amount indicates an amount of money necessary to use the second mobile communication network, and the second predetermined amount indicates an amount of money greater than an amount of money necessary to use the first mobile communication network.

2. The apparatus according to claim 1, further comprising:
a requesting unit that requests a payment apparatus to withdraw an amount of money greater than a difference between the predetermined amount and the balance from an account of the user of the mobile communication terminal when changing from the second mobile communication network to the first mobile communication network in a case where the balance is less than the predetermined amount.

3. The apparatus according to claim 1, wherein the notifying unit changes a format of the usage status information in conformity with the second mobile communication network before being sent.

4. The apparatus according to claim 1, further comprising:
a determination unit that determines whether the mobile communication terminal currently connected to the second mobile communication network moves to an area in which the first mobile communication network can be used, wherein:
the notifying unit initiates the notification upon detection of the mobile communication terminal moving to the area.

5. The apparatus according to claim 1, further comprising:
a receiving unit that receives an instruction of a user, which is input to the mobile communication terminal, wherein:
the notifying unit initiates the notification when the instruction indicates changing from the second mobile communication network to the first mobile communication network.

6. A system comprising:
a mobile communication terminal configured to use selectively one of a plurality of identifiers each of which is assigned to respective one of a plurality of communication networks, so as to selectively perform communication; and a notification apparatus configured to notify the mobile communication terminal of information:
the notification apparatus comprising:
  a memory that stores a credit balance available for a user of the mobile communication terminal;
  an obtaining unit that obtains usage status information on a use of a first of the plurality of mobile communication networks, which is generated based on the balance when the mobile communication terminal is currently connected to a second of the plurality of mobile communication networks using a second of the plurality of identifiers, the information including a predetermined amount for the use of the first mobile communication network and a notice if the credit balance is less than the predetermined amount for the use of the first mobile communication network;
  a notifying unit that notifies the usage status information to the mobile communication terminal via the second mobile communication network;
  the usage status information includes first usage status information indicative of whether the balance is less than a first predetermined amount for the use of the second mobile communication network that is currently used by the mobile communication terminal, and second usage status information indicative of whether the balance is less than a second predetermined amount for the use of the first mobile communication network that is currently unused by the mobile communication terminal;
  the first predetermined amount indicates an amount of money necessary to use the second mobile communication network, and the second predetermined amount indicates an amount of money greater than an amount of money necessary to use the first mobile communication network; and
the mobile communication terminal comprising:
  a memory that stores the plurality of identifiers such that an identifier in use for performing communication is distinguishable from another identifier; and
  a prohibiting unit that prohibits a use of the other identifier.

7. A method comprising:
obtaining usage status information on a use of a first of a plurality of mobile communication networks, which is generated based on a credit balance available for a user of a mobile communication terminal when the mobile communication terminal is currently connected to a second of the plurality of mobile communication networks using a second of a plurality of identifiers, the usage status information including a predetermined amount for the use of the first mobile communication network and a notice if the credit balance is less than the predetermined amount for the use of the first mobile communication network, the mobile communication terminal configured to use selectively one of a first of the plurality of identifiers and the second identifier which are assigned to the first mobile communication network and the second mobile communication network, respectively, so as to selectively perform communication; and
notifying the usage status information to the mobile communication terminal via the second mobile communication network;
wherein:
the usage status information includes first usage status information indicative of whether the balance is less than a first predetermined amount for the use of the second mobile communication network that is currently used by the mobile communication terminal, and second usage status information indicative of whether the balance is less than a second predetermined amount for the use of the first mobile communication network that is currently unused by the mobile communication terminal; and
the first predetermined amount indicates an amount of money necessary to use the second mobile communication network, and the second predetermined amount indicates an amount of money greater than an amount of money necessary to use the first mobile communication network.

8. A program stored on a non-transitory computer readable medium, the program for causing a computer to execute:
obtaining usage status information on a use of a first of a plurality of mobile communication networks, which is generated based on a credit balance available for a user of a mobile communication terminal when the mobile communication terminal is currently connected to a second of the plurality of mobile communication networks using a second of a plurality of identifiers, the usage status information including a predetermined amount for the use of the first mobile communication network and a notice if the credit balance is less than the predetermined amount for the use of the first mobile communication network, the mobile communication terminal configured to use selectively one of a first of the plurality of identifiers and the second identifier which are assigned to the first mobile communication network and the second mobile communication network, respectively, so as to selectively perform communication; and notifying the usage status information to the mobile communication terminal via the second mobile communication network;

wherein:

the usage status information includes first usage status information indicative of whether the balance is less than a first predetermined amount for the use of the second mobile communication network that is currently used by the mobile communication terminal, and second usage status information indicative of whether the balance is less than a second predetermined amount for the use of the first mobile communication network that is currently unused by the mobile communication terminal; and the first predetermined amount indicates an amount of money necessary to use the second mobile communication network, and the second predetermined amount indicates an amount of money greater than an amount of money necessary to use the first mobile communication network.

\* \* \* \* \*